United States Patent
Arabackyj et al.

(10) Patent No.: US 9,748,875 B2
(45) Date of Patent: Aug. 29, 2017

(54) METHOD AND DEVICE FOR OPERATING A BRUSHLESS DC MOTOR

(71) Applicants: CONTI TEMIC MICROELECTRONIC GMBH, Nuremberg (DE); CONTINENTAL AUTOMOTIVE GMBH, Hannover (DE)

(72) Inventors: Marc Arabackyj, Nuremberg (DE); Edgar Jerichow, Nuremberg (DE); Mathias Kuhn, Eckental (DE); Thomas Guertler, Nuremberg (DE); Andreas Pschorr, Regensburg (DE); Robert Loerincz, Timisoara (RO)

(73) Assignees: Conti Temic microelectronic GmbH, Nuremberg (DE); Continental Automotive GmbH, Hannover (DE)

( * ) Notice: Subject to any disclaimer, the term of this patent is extended or adjusted under 35 U.S.C. 154(b) by 31 days.

(21) Appl. No.: 14/785,755

(22) PCT Filed: Apr. 17, 2014

(86) PCT No.: PCT/EP2014/057857
§ 371 (c)(1),
(2) Date: Oct. 20, 2015

(87) PCT Pub. No.: WO2014/173792
PCT Pub. Date: Oct. 30, 2014

(65) Prior Publication Data
US 2016/0079906 A1    Mar. 17, 2016

(30) Foreign Application Priority Data

Apr. 26, 2013  (EP) ..................................... 13002218
Oct. 16, 2013  (DE) ......................... 10 2013 220 979

(51) Int. Cl.
*H03K 5/00* (2006.01)
*H02P 6/12* (2006.01)
(Continued)

(52) U.S. Cl.
CPC .................. *H02P 6/12* (2013.01); *H02P 6/16* (2013.01); *H02P 29/022* (2013.01); *H02P 29/0241* (2016.02)

(58) Field of Classification Search
CPC ............. H02P 29/022; H02P 6/16; H02P 6/12
(Continued)

(56) References Cited

U.S. PATENT DOCUMENTS 7,965,053 B2 *  6/2011  Borisavljevic ............ G01P 3/48
                                                        318/400.31
8,018,188 B2 *  9/2011  Schwarzkopf ............ H02P 6/18
                                                        318/254.1
(Continued)

FOREIGN PATENT DOCUMENTS

DE         10207549 A1    9/2003
DE      102004019284 A1   11/2005
(Continued)

OTHER PUBLICATIONS

Texas Instruments, "Brushless DC Motor Controller", Jan. 2002, XP002740624, http://www.ti.com/lit/ds/symlink/ucc26.

*Primary Examiner* — Bentsu Ro
*Assistant Examiner* — Gabriel Agared
(74) *Attorney, Agent, or Firm* — Laurence A. Greenberg; Werner H. Stemer; Ralph E. Locher

(57) ABSTRACT

A method for operating a three-phase brushless DC motor with a pulse-width modulation controlled electronic commutation in the event of a malfunction. A maximum number (n) of commutation steps, a direction of motor rotation and at least two possible operating end states are specified, and
(Continued)

one of the operating end states is chosen. Following indication of a malfunction, the rotor of the brushless DC motor is rotated at the specified maximum number (n) of commutation steps in the specified direction of motor rotation and the brushless DC motor is then set to the operating end state selected.

13 Claims, 3 Drawing Sheets

(51) Int. Cl.
   *H02P 6/16*     (2016.01)
   *H02P 29/02*    (2016.01)
   *H02P 29/024*   (2016.01)

(58) Field of Classification Search
   USPC .................................................. 318/400.13
   See application file for complete search history.

(56) References Cited

U.S. PATENT DOCUMENTS

| | | | |
|---|---|---|---|
| 8,248,007 B2* | 8/2012 | Matsuo | H02P 21/0003 |
| | | | 318/400.02 |
| 8,294,398 B2* | 10/2012 | Weissbach | G01P 13/04 |
| | | | 318/400.11 |
| 8,547,047 B2 | 10/2013 | Bonin et al. | |
| 2005/0212548 A1 | 9/2005 | Kim et al. | |
| 2009/0121664 A1* | 5/2009 | Sugimoto | E05F 15/697 |
| | | | 318/400.09 |

FOREIGN PATENT DOCUMENTS

| | | |
|---|---|---|
| DE | 102007031429 A1 | 1/2009 |
| DE | 102010024238 A1 | 12/2011 |

\* cited by examiner

METHOD AND DEVICE FOR OPERATING A BRUSHLESS DC MOTOR

BACKGROUND OF THE INVENTION

Field of the Invention

The invention relates to a method for operating a three-phase brushless DC motor with pulse-width-modulation-controlled electronic commutation. The invention also relates to a motor controller device for performing the method.

Safety-critical systems must be set into a safe operating state in the event of a dangerous malfunction. By way of example, the standard ISO 26262 specifies safety integrity levels ASIL (=automotive safety integrity levels) for safety-critical systems in motor vehicles.

In some applications with electronically controlled brushless DC motors, a safe system state is reached, for example, by the brushless DC motor being actively moved into a previously defined operating state, for example a decoupled state in the case of a transmission actuator. Alternatively, the system can be moved into a safe operating state with mechanical means, for example by decoupling using a spring, or with microcontroller support, as a result of which, however, the probability of achieving operating states of high safety integrity levels in the event of malfunctions of the electronic drive controller system is, in part, significantly reduced.

BRIEF SUMMARY OF THE INVENTION

The invention is based on the object of specifying an improved method for safe operation of a brushless DC motor in the event of a malfunction. The invention is also based on the object of specifying a motor controller device for performing the method.

The object is achieved according to the invention in respect of the method by the features of the claimed method and in respect of the device by the features of the claimed device.

Advantageous configurations of the invention are the subject matter of the dependent claims.

In the case of the method according to the invention for operating a brushless DC motor with pulse-width-modulation-controlled electronic commutation in the event of a malfunction, a maximum number of commutation steps, a direction of rotation of the motor and at least two possible operating end states are predefined and one of the operating end states is selected. Following indication of the malfunction, the rotor of the brushless DC motor is rotated at the predefined maximum number of commutation steps in the predefined direction of rotation of the motor and the motor is then set into the selected operating end state.

The method makes it possible to set a brushless DC motor into a safe operating end state in an active and controlled manner in the event of a safety-critical malfunction. This advantageously occurs with maximum modulation factor of the commutated pulse-width-modulation, with the result that reaching the safe operating end state is not impaired by the malfunction. In this case, the operating end state can be selected and thus advantageously adapted to the respective applications and requirements. In particular, safety integrity levels of the standard ISO 26262 up to level ASIL D can be fulfilled as a result.

A configuration of the invention provides that, following indication of the malfunction, the rotor of the brushless DC motor is rotated at a maximum modulation factor of the commutated pulse-width-modulation. An alternative configuration provides that a current threshold value for a motor current of the brushless DC motor and an interruption period are predefined, and that, following indication of the malfunction, the motor current is continuously measured and the rotor of the brushless DC motor is rotated at a maximum modulation factor of the commutated pulse-width-modulation, provided the motor current does not exceed the current threshold value, and the level of the pulse-width-modulation signal is changed for the interruption period if the motor current exceeds the current threshold value.

In the case of both configurations, following indication of the malfunction, the rotor of the brushless DC motor is first rotated at a maximum modulation factor. What is advantageously prevented as a result is that the rotation of the rotor is influenced by an external change to the pulse-width-modulation signal in the presence of a malfunction and reaching the respectively selected operating end state in a controlled manner is compromised thereby. In addition, the second configuration limits the motor current and, as a result, advantageously increases the operational safety of the motor.

Another configuration of the invention provides that the number of commutation steps performed following indication of the malfunction is monitored by at least one sensor signal indicating a rotor position of the rotor.

This advantageously makes it possible to monitor and to count the commutation steps which are actually performed following indication of the malfunction until the predefined maximum number is reached.

Another configuration of the invention provides that a disconnection period is predefined and, following indication of the malfunction, the brushless DC motor is set into the selected operating end state if the at least one sensor signal does not change during a period exceeding the disconnection period.

This configuration advantageously makes it possible to react to the situation of non-rotation of the rotor, for example by defects such as motor blockades, by the motor being set into the selected safe operating end state if such a defect prevents the predefined maximum number of commutation steps being reached.

Further configurations of the invention provide that a freewheeling state, that is to say a high-resistance state between outputs of actuation electronics of the brushless DC motor, and/or a braking state, that is to say a low-resistance state between outputs of actuation electronics of the brushless DC motor, are predefined as possible operating end states.

A freewheeling state and a braking state are safe operating states of brushless DC motors and are therefore advantageously particularly suited as predefined operating end states.

A motor controller device according to the invention comprises a converter which has an electrical half-bridge with two electronic switches for each phase of the brushless DC motor, and a control unit for controlling the electronic switches. In this case, the control unit has interfaces for receiving the indication of the malfunction, the commutated pulse-width-modulation signal, the selection of an operating end state and at least one sensor signal indicating a rotor position of the rotor of the brushless DC motor. In addition, the control unit is designed to evaluate the at least one sensor signal to detect performed commutation steps and to store the predefined maximum number of commutation steps, the predefined direction of rotation of the motor and, for each of the possible operating end states, a switch state, assigned to the operating end state, of the electronic switches.

A motor controller device such as this makes it possible to perform the method according to the invention having the above-mentioned advantages.

Preferably, the control unit is in this case designed to, following indication of the malfunction, count the detected commutation steps and to adjust the switch state, assigned to the selected operating end state, of the electronic switches if the number of the counted commutation steps reaches the predefined maximum number.

As a result, the motor can be set into a safe operating end state in an active and controlled manner once the predefined maximum number of commutation steps has been reached.

Preferably, the control unit has a counter register and is designed to initialize the memory content of the counter register with the predefined maximum number of commutation steps and, following indication of the malfunction, to decrement said memory content by one in the event of each detected commutation step.

As a result, the number of the commutation steps performed following indication of the malfunction can be detected and evaluated in a simple and efficient manner.

Preferably, the control unit is designed to, following indication of the malfunction, acquire a period after each detected commutation step, during which period the at least one sensor signal does not change.

As a result, advantageously, defects such as motor blockades, which prevent rotation of the motor, can be detected by the control unit.

Furthermore, a disconnection period is preferably stored in the control unit and the control unit is designed to adjust the switch state, assigned to the selected operating end state, of the electronic switches if the at least one sensor signal does not change during a period exceeding the disconnection period.

Furthermore, the control unit is preferably designed with an adjustable current threshold. When said adjustable current threshold is exceeded, the actuation signal is interrupted for a predefinable period of time and hence the maximum current is limited.

Furthermore, when a current threshold is exceeded within a predefined time, the motor error blockade is detected and the actuator is set into the predefined end state.

This advantageously makes it possible to react to defects such as motor blockades, which prevent a rotation of the motor, by disconnecting the motor if the rotor cannot be rotated.

Furthermore, the motor controller device preferably has means for measuring a motor current of the brushless DC motor, and the control unit is designed to change the level of the pulse-width-modulation signal for an interruption period if the motor current exceeds a current threshold value.

As a result, the motor current may advantageously be limited in an operating end state in the case of the method.

BRIEF DESCRIPTION OF THE SEVERAL VIEWS OF THE DRAWING

Examplary embodiments of the invention are explained in more detail below on the basis of drawings, in which.

Mutually corresponding parts are provided with identical reference signs in all the figures.

DESCRIPTION OF THE INVENTION

Figure 1:
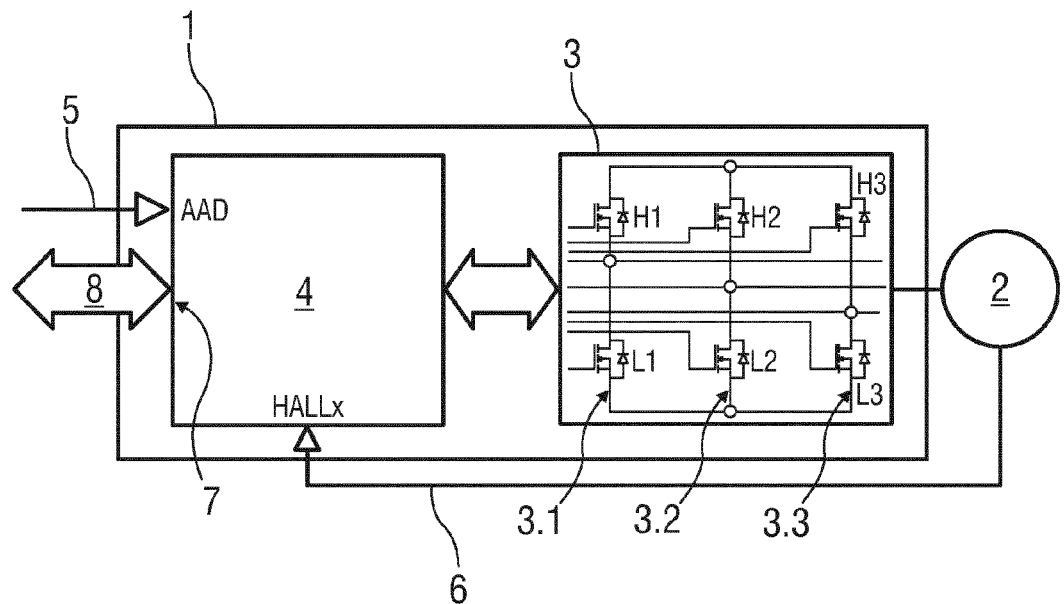
FIG. 1 schematically shows a motor controller device for a brushless DC motor, FIG. 2 schematically shows the adjustment of a first operating end state of a brushless DC motor following indication of a malfunction, FIG. 3 schematically shows the adjustment of a second operating end state of a brushless DC motor following indication of a malfunction, FIG. 4 schematically shows the adjustment of a second operating end state of a brushless DC motor following indication of a malfunction, in the event that the rotor of the motor does not rotate, and FIG. 5 schematically shows the control of a motor current of a brushless DC motor following indication of a malfunction.

FIG. 1 schematically shows a motor controller device 1 for commutating a three-phase brushless DC motor 2 which is not illustrated in more detail.

The motor controller device 1 has a converter 3 which has an electrical half-bridge 3.1, 3.2, 3.3 for each phase of the brushless DC motor 2. Each half-bridge 3.1, 3.2, 3.3 has a first electronic switch H1, H2, H3 and a second electronic switch L1, L2, L3, between which the respective phase of the brushless DC motor 2 is connected. The first electronic switches H1, H2, H3 are connected in parallel with one another and connected to a positive pole of a voltage supply of the converter 3. The second electronic switches L1, L2, L3 are likewise connected in parallel with one another and connected to a negative pole of the voltage supply. The electronic switches H1, H2, H3, L1, L2, L3 are each designed, for example, as a MOSFET (metal-oxide semiconductor field-effect transistor) or, alternatively, as an IGBT (insulated-gate bipolar transistor).

Furthermore, the motor controller device 1 comprises a control unit 4 for controlling the electronic switches H1, H2, H3, L1, L2, L3. The control unit 4 has a first interface AAD for receiving an emergency signal 5 for indicating a safety-critical malfunction, a second interface HALLx for receiving at least one sensor signal 6 for indicating a rotor position of the rotor of the brushless DC motor 2, for example at least one Hall sensor signal, and at least one further interface 7 for receiving motor control signals 8, in particular a commutated pulse-width-modulation signal PWM of the commutation.

In order to move the brushless DC motor 2 into a safe operating state in the event of a malfunction, a maximum number n of commutation steps, a direction of rotation of the motor and two possible operating end states of the brushless DC motor 2 are predefined. The operating end state is in this case selectable, with the result that it is adaptable to the respective application, that is to say the motor controller device 1 is configurable in respect of the operating end state.

Each of the two predefined operating states has a switch state of the electronic switches H1, H2, H3, L1, L2, L3 assigned thereto. A first possible operating end state is in this case a freewheeling state of the brushless DC motor 2, to which a state of maximum impedance of the converter 3 is assigned as switch state, in which all of the electronic switches H1, H2, H3, L1, L2, L3 are switched off. The second possible operating end state is a braking state of the brushless DC motor 2, to which a switch state is assigned in which, in the normal case, all the second electronic switches L1, L2, L3 are switched on and all the first electronic switches H1, H2, H3 are switched off and, in the exception case of a short-circuit between the first electronic switches H1, H2, H3 and the phases of the brushless DC motor 2, all the first electronic switches H1, H2, H3 are switched on and all the second electronic switches L1, L2, L3 are switched off. If an emergency signal 5 for indicating a malfunction is received at the first interface AAD, following indication of the malfunction, the rotor of the brushless DC motor 2 is rotated at a maximum modulation factor of the commutated pulse-width-modulation in the predefined direction of rotation of the motor and the motor is set into the selected operating end state in the manner described below once the predefined maximum number n of commutation steps has been reached or in the event that the rotor of the motor does not rotate.

Figure 2:
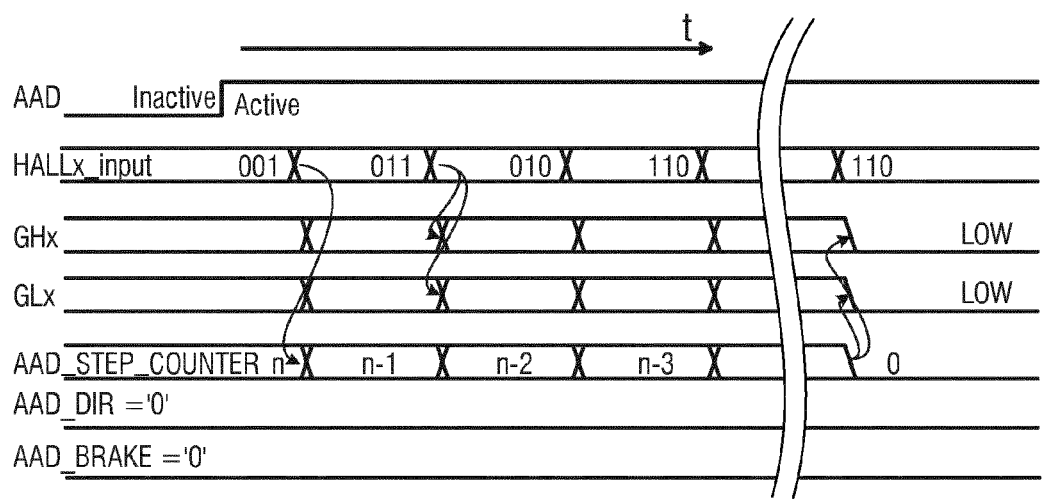

FIG. 2 schematically shows the mode of function of the motor controller device 1 following indication of a malfunction on the basis of a time t in the event that the first operating end state of the brushless DC motor 2 has been selected. The indication of the malfunction is illustrated in FIG. 2 by the change in state of the first interface AAD from inactive to active.

The operating end state is selectable in this exemplary embodiment by means of an end-state value AAD_BRAKE. The first operating end state is selected by said value being set to zero by AAD_BRAKE='0'.

In this exemplary embodiment, the control unit 4 has a counter register and is designed to initialize the memory content of the counter register with the predefined maximum number n of commutation steps and, following indication of the malfunction, to decrement said memory content by one in the event of each detected commutation step. In this case, the control unit 4 detects a commutation step by evaluating the at least one sensor signal 6. The instantaneous memory content of the counter register is stored as a register value AAD_STEP_COUNTER. The rotor position of the rotor of the brushless DC motor 2 is stored as rotor position value HALLx_input, which specifies for each phase of the brushless DC motor 2 whether or not said phase is energized. GHx and GLx (x=1, 2, 3) stand in FIG. 2 by way of example for control values for the actuation of the two electronic switches H1, H2, H3, L1, L2, L3 of a half-bridge 3.1, 3.2, 3.3. The direction of rotation of the motor is predefined using a direction of rotation value AAD_DIR, wherein AAD_DIR='0' is predefined in the example illustrated in FIG. 2.

In the case of each commutation step, the rotor position value HALLx_input changes. In the case of each change in HALLx_input, the register value AAD_STEP_COUNTER and, accordingly, the memory content of the counter register is decremented by one and the switch state of the electronic switches H1, H2, H3, L1, L2, L3 is changed for the next commutation step, as indicated in FIG. 2 for such a change by curved arrows which are directed downward. If AAD_STEP_COUNTER reaches the value zero, the control unit 4 adjusts that switch state of the electronic switches H1, H2, H3, L1, L2, L3 which is assigned to the first operating end state, that is to say all electronic switches H1, H2, H3, L1, L2, L3 are switched off, as indicated in FIG. 2 by curved arrows which are directed upward.

Figure 3:
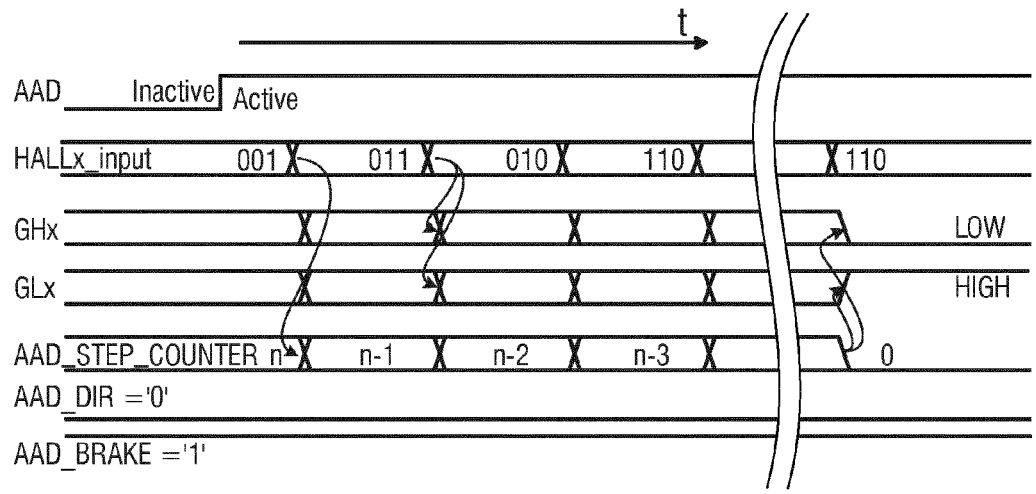

FIG. 3 schematically shows, in an analogous manner to FIG. 2, the mode of function of the motor controller device 1 following indication of a malfunction in the event that the second operating end state of the brushless DC motor 2 has been selected. The single difference to the mode of function of the motor controller device 1 illustrated in FIG. 2 consists in that, in this case, AAD_BRAKE='1' is predefined and, accordingly, that switch state of the electronic switches H1, H2, H3, L1, L2, L3 is adjusted which is assigned to the second operating end state when AAD_STEP_COUNTER='0' has been reached.

Figure 4:
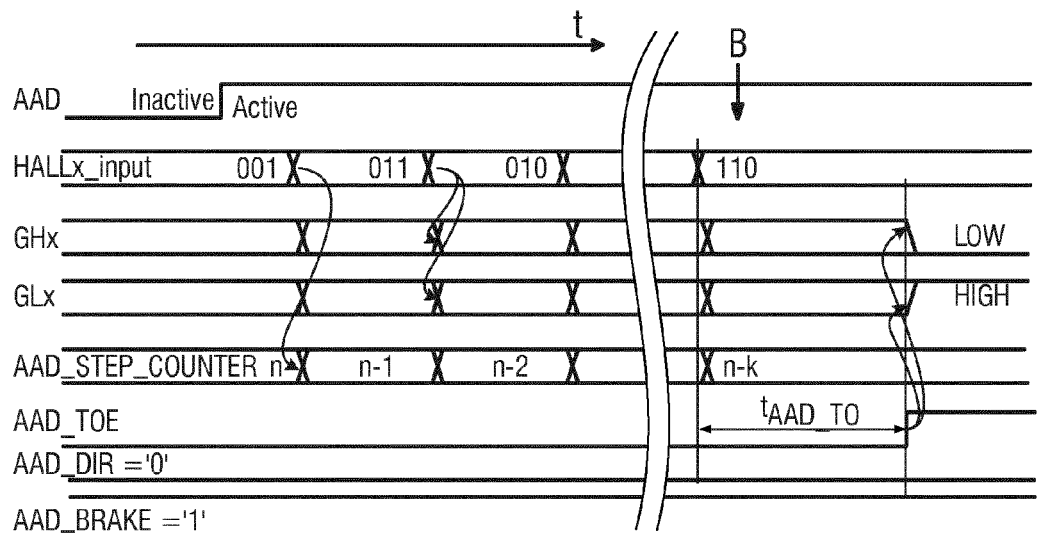

FIG. 4 schematically shows, in an analogous manner to FIGS. 2 and 3, the mode of function of the motor controller device 1 following indication of a malfunction, in the event that the brushless DC motor 2 blocks before the predefined maximum number n of commutation steps has been reached. A disconnection period $t_{AAD\_TO}$ is predefined for such a case. Following indication of a malfunction, the period during which the at least one sensor signal 6 does not change is detected by the control unit 4 after each commutation step. If such a period of time detected by the control unit 4 exceeds the disconnection period $t_{AAD\_TO}$, the brushless DC motor 2 is set into the selected operating state.

In the case illustrated in FIG. 4, the rotation of the rotor of the brushless DC motor 2 stops once AAD_STEP_COUNTER='n−k' has been reached, that is to say once k commutation steps have been performed following indication of a malfunction. The instant of rotation stop B is indicated in FIG. 4 by a vertical arrow. The rotor of the brushless DC motor 2 cannot be rotated further after the kth commutation step.

The control unit 4 detects that the at least one sensor signal 6 does not change after the kth commutation step during the disconnection period $t_{AAD\_TO}$ and subsequently adjusts that switch state of the electronic switches H1, H2, H3, L1, L2, L3 which is assigned to the second operating end state since said operating end state is selected in the illustrated case by AAD_BRAKE='1'. The course of the disconnection period $t_{AAD\_TO}$ after the kth commutation step is indicated by a timing error AAD_TOE.

Figure 5:
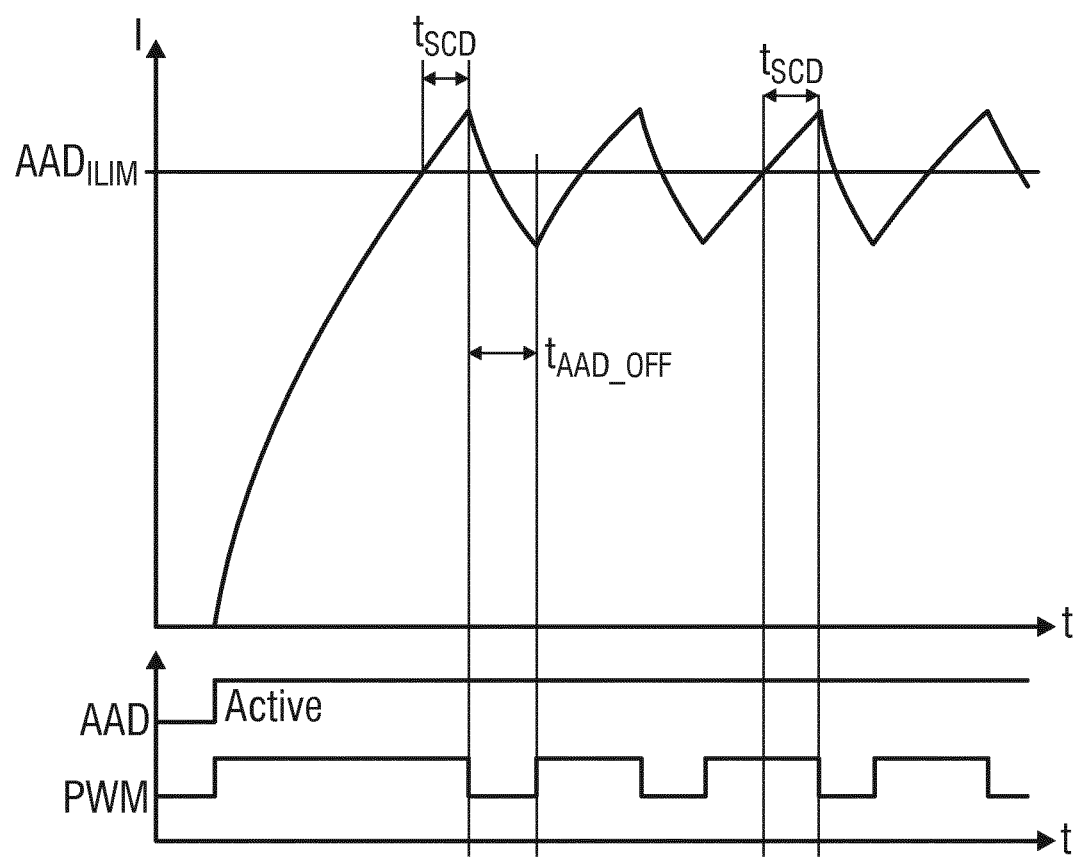

FIG. 5 shows a development of the invention in respect of limiting a motor current I of the brushless DC motor 2 following indication of the malfunction. In the case of said development, a current threshold value $AAD_{ILIM}$ for the motor current I and an interruption period $t_{AAD\_OFF}$ are predefined. Following indication of the malfunction, the motor current I is continuously measured. The rotor of the brushless DC motor 2 is, as described above, firstly rotated at the maximum modulation factor of the commutated pulse-width-modulation provided the motor current I does not exceed the current threshold value $AAD_{ILIM}$. However, once the current threshold value $AAD_{ILIM}$ has been exceeded, the level of the pulse-width-modulation signal PWM is changed for the interruption period $t_{AAD\_OFF}$ in order to limit the motor current I. Once the interruption period $t_{AAD\_OFF}$ has elapsed, the level of the pulse-width-modulation signal PWM is again changed and kept constant until the motor current I exceeds the current threshold value $AAD_{ILIM}$ once again. Between the current threshold value $AAD_{ILIM}$ being exceeded and the subsequent change in the pulse-width-modulation signal PWM, a system-dependent reaction time $t_{SCD}$ elapses in each case.

The above-described exemplary embodiment of the invention may be amended and extended in various ways. In particular, it can be amended in a manner obvious to a person skilled in the art to the control of brushless DC motors 2 with another number of phases.

LIST OF REFERENCE SIGNS 1 motor controller device
2 brushless DC motor
3 converter
3.1, 3.2, 3.3 half-bridge
4 control unit
5 emergency signal
6 sensor signal
7 interface motor control signal
AAD, HALLx interface
AAD_BRAKE end state value
AAD_DIR direction of rotation value
$AAD_{ILIM}$ current threshold value
AAD_STEP_COUNTER register value
AAD_TOE timing error
Active, Inactive interface state
B rotation stop
GHx, GLx control value
H1, H2, H3 first electronic switch
HALLx_input rotor position value
I motor current
L1, L2, L3 second electronic switch
n maximum number
PWM pulse-width-modulation signal
t time
$t_{AAD\_OFF}$ interruption period
$t_{AAD\_TO}$ disconnection period
$t_{SCD}$ reaction time

The invention claimed is:

1. A method of operating a three-phase brushless DC motor with a pulse-width-modulation-controlled electronic commutation in an event of a malfunction, the method comprising:
predefining a maximum number (a) of commutation steps, a direction of rotation of the motor, and at least two possible operating end states that can be selected in the event of the malfunction, wherein the at least two possible operating end states of the brushless DC motor include a braking state of the brushless DC motor and a freewheeling state of the brushless DC motor in which a converter for the brushless DC motor has a maximum impedance state;
selecting one of the at least two possible operating end states as a selected operating end state in the event of the malfunction:
upon an indication of the malfunction, rotating a rotor of the brushless DC motor by the predefined maximum number (a) of commutation steps in the predefined direction of rotation of the motor, and then setting the brushless DC motor to the selected operating end state;
when a first operating end state of the at least two possible operating end states is selected, using a control unit to put the converter in the maximum impedance state causing the brushless DC motor to be in a freewheeling state; and
when a second operating end state of the at least two possible operating end states is selected, using the control unit to put the converter in a state causing the brushless DC motor to be in a braking state.

2. The method according to claim 1, which comprises, following the indication of the malfunction, rotating the rotor of the brushless DC at a maximum modulation factor of the commutated pulse-width-modulation.

3. The method according to claim 1, which comprises:
predefining a current threshold value for a motor current of the brushless DC motor and an interruption period; and
following the indication of the malfunction, continuously measuring the motor current and rotating the rotor of the brushless DC at a maximum modulation factor of the commutated pulse-width-modulation as long as the motor current does not exceed the current threshold value, and changing a level of the pulse-width-modulation signal for the interruption period when the motor current exceeds the current threshold value.

4. The method according to claim 1, which comprises acquiring at least one sensor signal indicating a rotor position of the rotor, and monitoring a number of commutation steps performed following the indication of the malfunction by way of the at least one sensor signal.

5. The method according to claim 4, which comprises predefining a disconnection period and, following the indication of the malfunction, setting the brushless DC motor into the selected operating state if the at least one sensor signal does not change during a period exceeding the disconnection period.

6. The method according to claim 1, which comprises predefining a high-resistance state between outputs of actuation electronics of the brushless DC motor as the first possible operating end state.

7. The method according to claim 6, which comprises predefining a low-resistance state between the outputs of the actuation electronics of the brushless DC motor as the second possible operating end state.

8. The method according to claim 6, which comprises predefining a low-resistance state between outputs of actuation electronics of the brushless DC motor as a possible operating end state.

9. A motor control device for controlling a three-phase brushless DC motor with a pulse-width-modulation-controlled electronic commutation in an event of a malfunction, the motor control device comprising:
a converter having an electrical half-bridge with two electronic switches for each phase of the brushless DC motor; and
a control unit for controlling the electronic switches;
said control unit having interfaces for receiving the indication of the malfunction, the commutated pulse-width-modulation signal, the selection of an operating end state including at least a first operating end state and a second operating end state, and at least one sensor signal indicating a rotor position of the rotor of the brushless DC motor;
said control unit being configured to evaluate the at least one sensor signal to detect performed commutation steps and to store the predefined maximum number of commutation steps, the predefined direction of rotation of the motor and, for each of the possible operating end states, a switching state, assigned to the respective operating end state of the electronic switches;
said control unit being configured to control the converter to be in a maximum impedance state causing said brushless DC motor to be in a freewheeling state when said first operating end state is selected; and
said control unit being configured to control the converter to be in a state causing said brushless DC motor to be in a braking state when said second operating end state is selected.

10. The motor control device according to claim 9, wherein said control unit is configured, following the indication of the malfunction, to count the detected commutation steps and to adjust the switch state, associated with the selected operating end state, of the electronic switches if a number of the counted commutation steps reaches the predefined maximum number.

11. The motor control device according to claim 10, wherein said control unit comprises a counter register and said control unit is configured to initialize a memory content of said counter register with the predefined maximum number of commutation steps and, following the indication of the malfunction, to decrement the memory content by one for each detected commutation step.

12. The motor control according to claim 9, wherein said control is configured, following the indication of the malfunction, to acquire a period after each detected commutation step, during which the at least one sensor does not change.

13. The motor control device according to claim 12, wherein a disconnection period is stored in said control unit and said control unit is configured to adjust the switch state, associated with the selected operating end state, of the electronic switches if the at least one sensor signal does not change during a period exceeding the disconnection period.

\* \* \* \* \*